April 8, 1947. E. W. YETTER 2,418,538
MEASUREMENT OF DISTANCE BY FREQUENCY-MODULATED CARRIER WAVE
Filed June 30, 1944 3 Sheets-Sheet 1
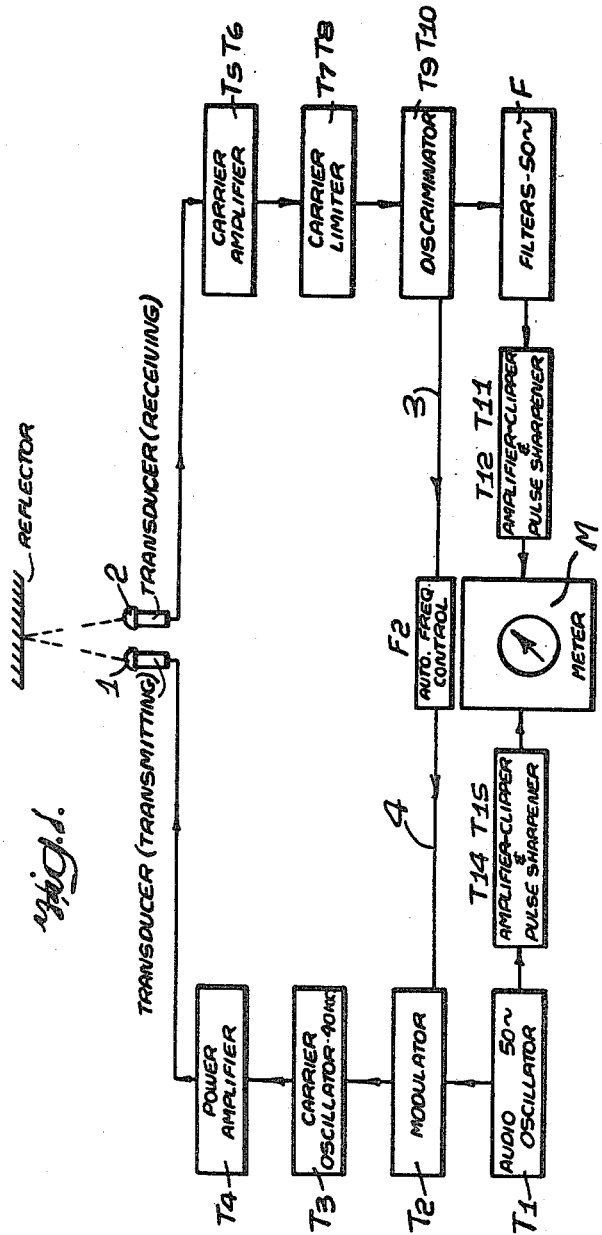
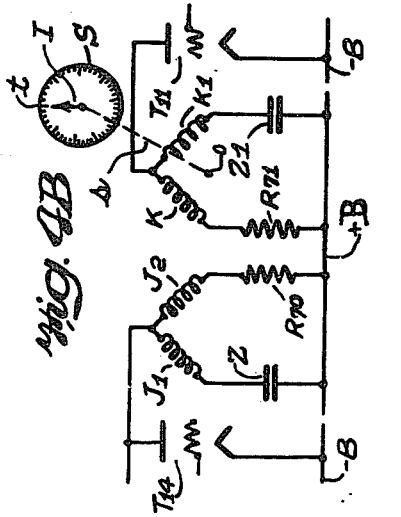
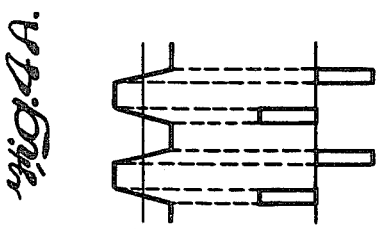
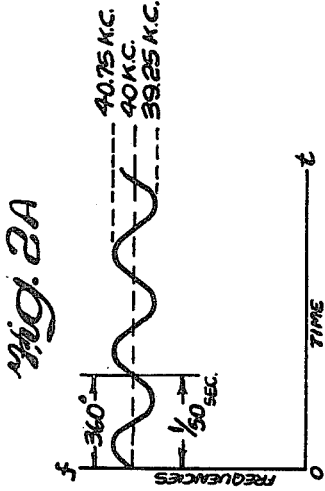
INVENTOR
EDWARD W. YETTER
BY
*C. L. Ehret*
ATTORNEY April 8, 1947.  E. W. YETTER  2,418,538
MEASUREMENT OF DISTANCE BY FREQUENCY-MODULATED CARRIER WAVE
Filed June 30, 1944  3 Sheets-Sheet 2
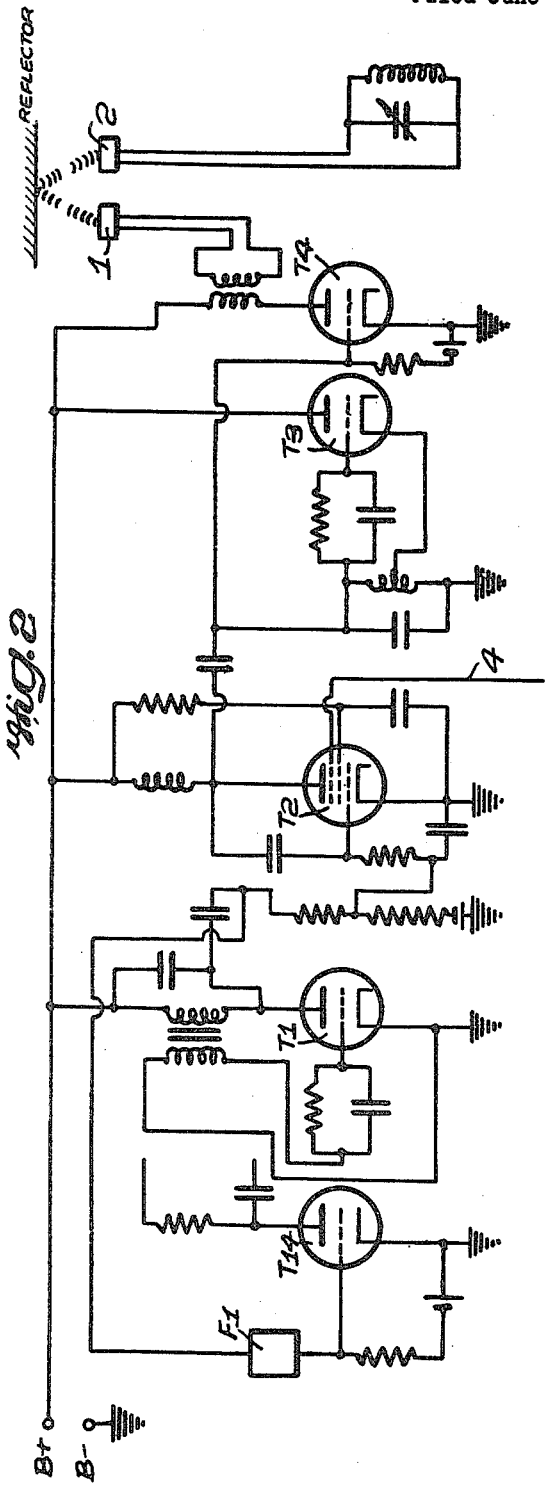
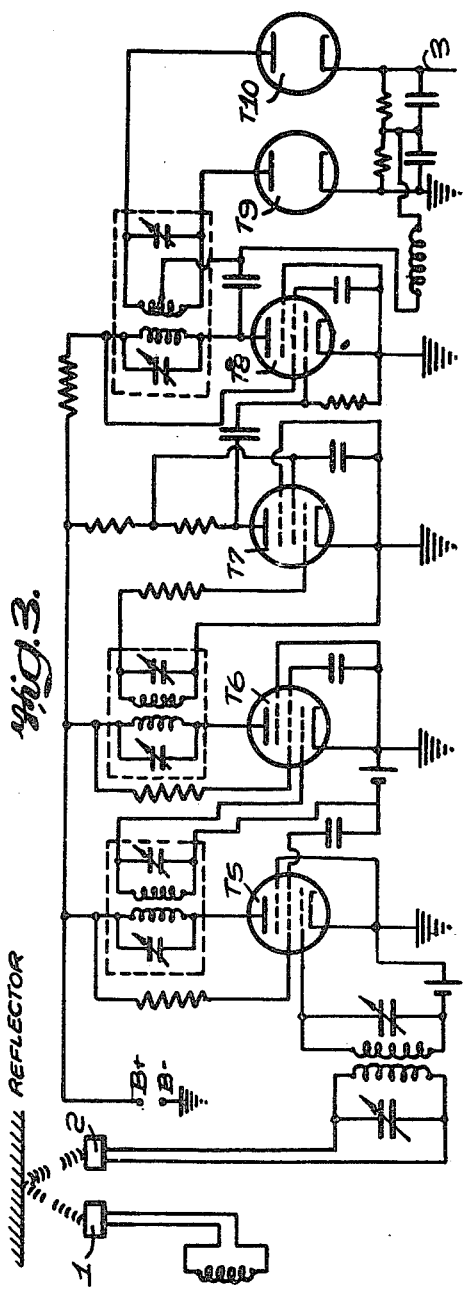
INVENTOR.
EDWARD W. YETTER
BY
C. D. Ehret
ATTORNEY

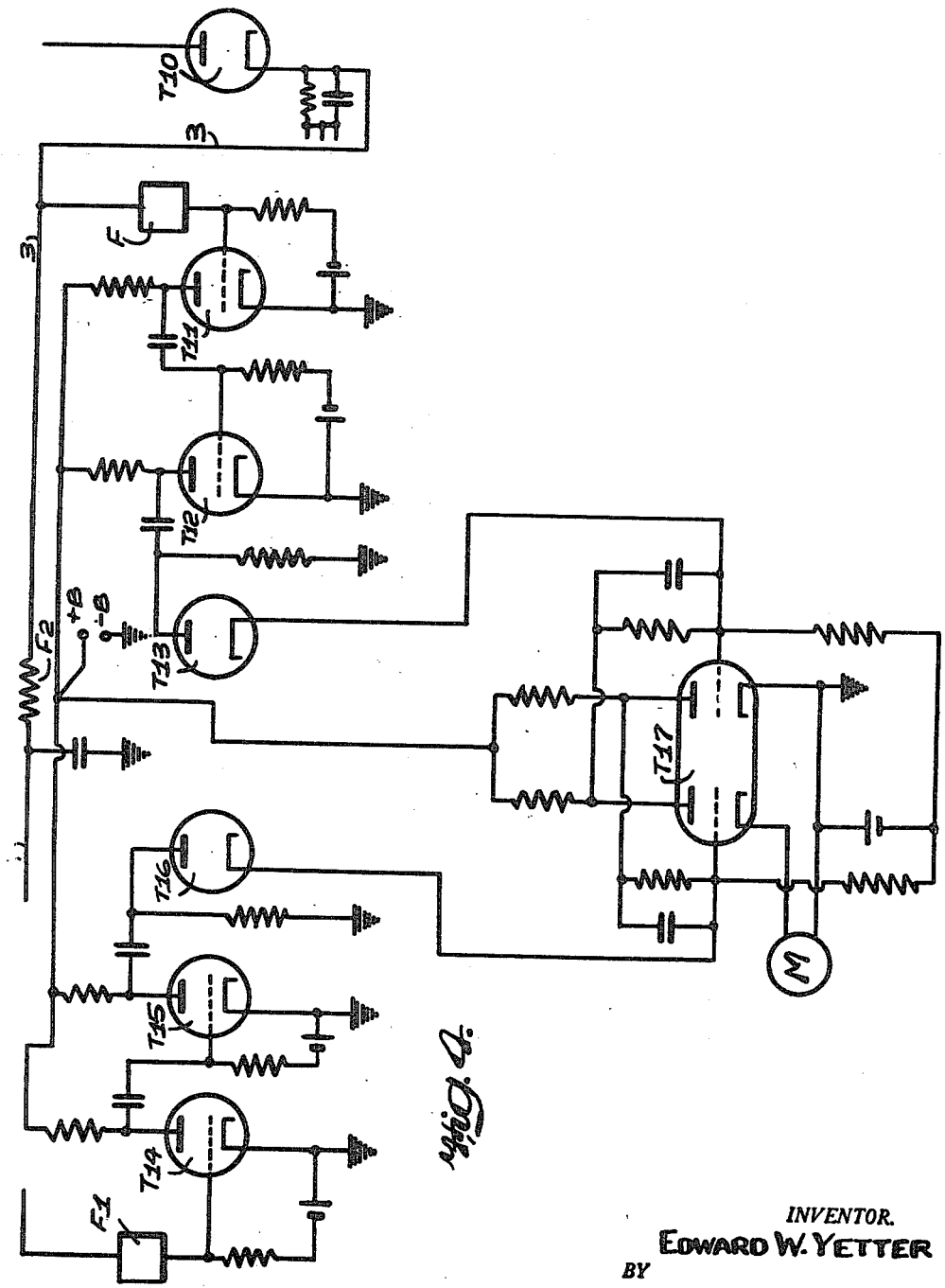

Patented Apr. 8, 1947

2,418,538

UNITED STATES PATENT OFFICE 2,418,538

MEASUREMENT OF DISTANCE BY FREQUENCY-MODULATED CARRIER WAVE

Edward W. Yetter, Philadelphia, Pa., assignor to Leeds and Northrup Company, Philadelphia, Pa., a corporation of Pennsylvania Application June 30, 1944, Serial No. 542,921

1 Claim. (Cl. 177—352)

My invention relates to measurement of distance, more particularly in a liquid or solid medium suitable for transmission of compression waves, between a given point and another, sometimes a wave-reflecting surface of or within the medium.

In accordance with a broad aspect of my invention an unknown distance, directly, or and usually via a reflecting surface, between a transmitter and a receiver of a sustained or continuous carrier wave of high audio or super-sonic frequency, propagated through aforesaid medium preferably in a sharp or narrow beam, and whose frequency is continuously modulated preferably sinusoidally at a predetermined fixed lower frequency, is measured by determination of the difference in phase between the transmitted and received current components whose frequency is aforesaid modulating frequency; the unknown distance is determined, in accordance with my invention from its relation of direct proportionality to the product of three factors: aforesaid phase difference, the velocity of propagation of the carrier wave through the medium in question, and the reciprocal of the frequency of modulation.

More particularly a continuously sustained carrier wave, of aforesaid frequency, is transmitted, preferably in a sharp or narrow beam, through aforesaid medium to a surface whose distance is to be determined, and reflected therefrom; the frequency of the carrier wave is at the transmitter continuously modulated at predetermined fixed and materially lower frequency; at the receiver, usually close to the transmitter, there is produced by the reflected wave a current of aforesaid carrier frequency modulated as aforesaid; and the magnitude of the difference of phase between the components of the transmitter and receiver currents of aforesaid frequency of modulation is a function of, and determinative of, aforesaid distance.

A further and concurrent effect of modulation of the frequency of the carrier wave is great reduction of the interfering effects by waves or pulses of noise-producing frequencies concurrently present in the wave-transmitting medium.

Further in accordance with my invention, spurious transient effects or responses, for example such as are inherent in distance-measuring systems of the impulse-type, are prevented in either or both of the transmitting and receiving systems by causing the carrier wave and the modulation of its frequency to be continuously sustained or uninterrupted; with the further advantage such transient effects and responses are not produced in cables, especially when of substantial lengths, leading from the transmitting system, as from the power amplifier thereof, to the transmitting transducer and/or leading from the receiving transducer to the receiving system, as to the input of the carrier amplifier thereof.

For the practice of my invention there may be used as primary elements when the wave-transmitting medium is water or other dense medium, non-magnetic crystal electro-acoustic transducers of known types which are small and of light weight, by employing a detecting system of high sensitivity such as may include means for high degree of amplification of the carrier wave representing the received compression wave of carrier frequency; and further in accord with my invention, effectiveness of operation of my system, when of high sensitivity as aforesaid, is substantially completely independent of the characteristics or properties of the reflecting surface.

Further in accordance with my invention there may be utilized narrow band-pass filters because only two significant frequencies are involved, aforesaid carrier frequency and the frequency of modulation; with result that narrow band-pass filtering then is itself sufficiently effective or sharp to eliminate the effects of destructive interference at the receiving transducer caused by momentary reception of waves of phase opposite to and of amplitude equal to the phase and amplitude, respectively, of the transmitted or reflected waves, with effect which I term carrier "blackout."

Further in accordance with my invention instant or immediate return to operating condition after a long period of such "blackout," is procured by automatically maintaining, upon disappearance of received signal energy, by self oscillation of the sharply tuned filtering means, the carrier frequency-modulating voltage at a predetermined fixed magnitude (an advantage impossible of attainment in any system of distance-measurement characterized by initiation of each transmitted impulse by and in response to the reflected return of the preceding transmitted impulse).

Automatic control of the center frequency of the carrier wave at a predetermined correct magnitude is determined by or in accordance with the center frequency of the carrier wave in the within described discriminator circuit of the receiving system, from which is derived a direct current voltage impressed upon and controlling action of the modulator upon the carrier oscillator of the transmitting system.

My invention resides in the methods and apparatus hereinafter described and claimed.

For an understanding of my invention reference is to be had to the accompanying drawings, in which, Fig. 1 is a block diagram of a preferred system embodying my invention, with identification of the various components or units and their electrical inter-relations;

Fig. 2 is a diagram of the electrical circuits of several units of the transmitting system;

Fig. 2A is a graph illustrative of modulation of the frequency of a carrier wave;

Fig. 3 is a diagram of the electrical circuits of several units of the receiving system;

Fig. 4 is a diagram of the electrical circuits of the system for measuring aforesaid phase-difference representative of the distance to be determined;

Fig. 4A is a graph representing the effects produced by the amplifier-clipper and pulse-sharpener units; and Fig. 4B is a diagrammatic representation of a modified system for measuring phase difference.

The wave-transmitting media with which my invention is concerned, are those through which are readily and effectively propagated or transmitted compressive waves. The type of medium comprises metallic and non-metallic solids, and liquids, commonly sea water, in which case the reflecting surface here in point may be the sea bottom or the interface between the water and the superposed atmosphere; or the reflecting surface may be that of a body wholly or partially submerged in the water, including, more particularly for fathometry, the sea bottom. In the case of metallic and non-metallic solids, the reflecting surface may be a boundary between the solid and cavity, fracture or the like within it.

In the use of compression waves, the carrier wave frequency may be within the range of high audio frequencies, for example 15,000 to 18,000 cycles per second, up to and including ultra-sonic or super-sonic frequencies, such, for example, as generically represented by 40,000 cycles per second. The frequency of the carrier waves is continuously sinusoidally modulated at low fixed frequency, such, for example, as 50 cycles per second, or much higher or lower, depending upon the order of the magnitude of distances to be measured and the velocity of carrier wave transmission as hereinafter described; and, generally, the ratio of the carrier frequency to that of the frequency of modulation thereof preferably will be at least 4 or 5 to 1.

In general, there is here involved the known relation shown by Equation 1, following:

$$D = \frac{V}{F}$$

where D is the distance from the transmitter to the reflector plus that from the latter to the receiver for and corresponding with a shift of phase of 360° (i. e. one complete cycle of the modulating frequency), between the current components of modulation frequency at the transmitter and receiver, respectively; V is the velocity of transmission or propagation of the carrier wave in the medium in question with respect to the transmitter (about 5000 feet per second in water) and F is the wave frequency, in accordance with my invention the frequency of modulation of the carrier wave.

The frequency of modulation is an important factor in this invention, which involves the relation shown by Equation 2, as follows:

$$\frac{X}{D} = \frac{\phi}{360}$$

in which $\phi$(phi) is the measured phase difference in degrees; upon substituting for D its aforesaid equivalent $$\frac{V}{F}$$

there results Equation 3, as follows:

$$X = \frac{\phi V}{360.F}$$

There is a fixed relation between X, the unknown distance, and aforesaid frequency of modulation; distance X is inversely proportional to frequency F which latter may be the lower as the order of magnitude of distance X increases, and therefore F may be selected for any chosen or predetermined range of distances within which the distance X will fall; and, in general, the unknown distance X is directly proportional to the product of the measured phase difference $\phi$, the known constant V, and the reciprocal of the known frequency of modulation F chosen with regard to the order of magnitude of the distances within which the distance X is comprehended.

Figs. 1–4 inclusive are diagrammatic of and exemplify a system comprehended by my invention employing a compressive carrier wave whose frequency is modulated at a periodic low frequency. Various units of the circuit diagrams of Figs. 2–4 are, per se, of known types and from their details are recognizable as such.

Referring in particular to Figs. 1 and 2, in Fig. 1 the transmitting system is illustrated in the form of a block diagram comprising the following: a vacuum tube oscillator T1 produces a voltage of modulating frequency, for example 50 cycles per second, impressed upon a quadrature type modulator, comprising a tube T2, whose reactance is varied at 50 cycles per second, and so causes a carrier oscillator T3 to produce a continuous carrier frequency varying from a mean or center frequency of say 40 kilocycles per second at a modulating frequency of 50 cycles per second.

The amplitude of the carrier wave is not significantly modulated; only the frequency of the carrier wave is modulated, as illustrated in Fig. 2A, in which ordinates are carrier frequencies and abscissae are units of time; the sinusoidal graph represents the modulation or variation, with respect to time, of the normal or mean carrier frequency of 40 kilocycles per second, resulting in variation of the carrier frequency from a maximum carrier frequency of say 40.75 kilocycles per second to a minimum frequency of 39.25 kilocycles. Fig. 2A is illustrative also of the modulation of the frequency of the received carrier wave as existing in the circuits of Fig. 3 later described. A phase difference of one complete cycle between the transmitter and receiver current components of modulation frequency is 360°, which represents an unknown distance X, Equation 2, equal to $$\frac{V}{F}$$

and for each magnitude of phase shift or difference in phase less than 360°, i. e. less than one complete cycle, each magnitude corresponds with a proportionately smaller distance X.

The output of oscillator T3 is impressed upon the amplifier T4, a power amplifier capable of supplying to the transmitting transducer 1 a current, of carrier frequency modulated as aforesaid, of high magnitude, sufficient for propagation through desired distances in the transmitting medium of compression waves of high power or amplitude.

The carrier waves preferably are propagated in a path confined within a very sharp or narrow angle, a beam which impinges upon the reflector surface and is reflected toward the receiving transducer 2, which is part of the receiving system shown in Fig. 3.

The transducers may be of any suitable type. For transmission through water, each of them may be, and preferably is, where small size and light weight are important, of the piezo crystal type comprising one or more such crystals, in operative relation with the electrical transmitting or receiving system, in direct contact with a suitable liquid, such as castor oil, enclosed in an elastic film, such for example as neoprene, which is in direct contact with the water or like medium.

Referring to Fig. 3, at the receiver there is impressed upon the input of the first stage T5 of a carrier band-pass amplifier a voltage of carrier frequency, modulated at the frequency aforesaid; the output of stage T5 is impressed upon a second like stage T6 whose output, amplified voltage of the character aforesaid, is impressed upon the input of the cascaded limiters T7 and T8, whose output terminals are connected respectively to the anodes of the diodes T9 and T10, which, with their associated circuits, constitute a frequency discriminator unit, which demodulates the frequency modulated carrier wave, so deriving as the output an alternating current of modulation frequency, in this example 50 cycles per second, which is passed via conductor 3, Figs. 3 and 4, through a narrow band-pass filtering unit F, Fig. 4, of any suitable character, such as an inductive capacitive filter, to T11, to remove so-called noise, harmonics (interfering pulses or continuous waves of any frequency and any phase generated or existing in the liquid or solid transmitting medium during measurement of distance) and the like, and excluding all frequencies differing by more than a few cycles from 50 cycles per second, which otherwise would detract from the accuracy of the ultimate measurement of the distance-representing phase difference, as affected by the output of diode T13. Filter F being sharply tuned by its inductance and capacitance to the modulation frequency, it will, as hereinbefore stated, in event of a period of blackout (by effect on the carrier waves of waves of equal amplitude and of opposite phase) by itself freely oscillating for a period approximating or corresponding with several cycles of modulation frequency, hold-over (automatically maintain) the operation of tube T11, and of the subsequent circuits dependent thereon, by maintaining on its grid the predetermined constant carrier frequency-modulating voltage, without change in the distance-representing excitation of meter M, Fig. 4.

The alternating voltage output of filter unit F is impressed upon the input of the amplifier T11, whose output is connected to the input of the tube T12, Fig. 4, which tubes, T11 and T12 and their circuits constitute an amplifier-clipper unit. Reverting to Fig. 2, there is provided an amplifier tube T14, of the character and purpose of aforesaid tube T11, upon whose input there is impressed voltage of the low modulating frequency, such as 50 cycles per second, derived from the output circuit of the low frequency oscillator T1, through the phase shifter unit F1, comprising, for example, a capacitive resistive network at least one of whose elements is adjustable. The output of amplifier T14 is impressed upon the input of the clipper tube circuit T15, which is comprised in Fig. 4, tubes T14 and T15 and their circuits constituting an amplifier-clipper unit corresponding with aforesaid unit T11, T12.

In each of the aforesaid units, tubes T11 and T14 may operate substantially entirely as amplifiers, while the tubes T12 and T15 operate as overloaded amplifiers each having the effect that in its output the alternating half waves of substantially sinusoidal form and of modulation frequency are for a great part of the durations of each reduced or clipped, as indicated in Fig. 4A, to amplitudes which are substantially constant. The output of each of tubes T12 and T15 is impressed upon a pulse-sharpening unit or circuit comprising, as shown, a condenser and resistance, having the effect, as indicated in the lower portion of Fig. 4A, of materially sharpening or materially reducing the duration of the clipped positive and negative half waves.

Of aforesaid sharpened impulses, the positive ones only pass through diodes T13 and T16, Fig. 4, to the grids of the double amplifier tube T17, whose associated circuit arrangements are such that each sharpened impulse renders one plate circuit conductive, for a time materially greater than the duration of the sharpened impulse itself, whereby in one of the two plate-cathode circuits there is produced a series of now broadened unidirectional impulses of increased duration representing the phase difference between the transmitter current of modulation frequency and the receiver current of the same modulation frequency. These current impulses pass through the phase meter M, such as a direct current milliammeter, of D'Arsonval or equivalent type. The meter having a deflection scale linear in character, the meter readings are representative of or proportional to the difference of phase between the transmitter and receiver impulses of modulation frequency, such difference in phase being a simple function of or proportional to the distance traveled or the time of travel by or of the carrier wave through the wave propagating medium from the transmitting transducer to the receiving transducer, via the reflector, Figs. 1 and 2.

Full meter scale range from zero to maximum is or may be 360°, corresponding with a phase difference of one complete cycle of modulation frequency. If the distance of the reflector be so great that the resultant phase difference is greater than 360°, the deflecting pointer of the meter will indicate only the number of degrees of phase difference in excess of integral multiples of 360°; so that usually the frequency of modulation, other things being the same, is so chosen in relation to the range of magnitudes of distances to be measured that none of the distances within that range will effect a phase difference exceeding 360°, unless there be provided means rendering the meter suitable for measurement of phase differences greater than one or more units of 360°.

It shall be understood the type of phase meter employed is largely a matter of indifference and that types other than aforesaid may be utilized, so long as there be produced deflections or readings in terms of phase difference, distance or time.

In Fig. 4B is illustrated a known type of phase meter dispensing with the units T12, T13, T15, T16 and T17, of Fig. 4; the output of modulation frequency of amplifier T14, of the transmitting system, passes through the stator windings J1 and J2, angularly displaced with respect to each other, respectively in series with capacitive reactance Z (or an inductive reactance) and resistance R70; rotatable as a unit about the axis o, in the field produced by windings J1 and J2, are the windings K, K1, displaced at an angle with respect to each other, respectively connected in series with resistance R71 and capacitive reactance Z1, or an inductive reactance; the windings K, K1 are traversed by the alternating current output of modulating frequency from the amplifier T11 of the receiving system; with resultant rotation of shaft s upon which is mounted the index or pointer I so deflectable with respect to the meter scale S, whose extent corresponds with 360° phase displacement between currents of modulating frequency supplied respectively by amplifiers T11 and T14; or the scale S may be calibrated in terms of distances or units of time. Should the range of the distances to be measured involve phase displacements exceeding 360°, there may be driven by shaft s a counter of complete revolutions of index I, each revolution counted corresponding with 360° phase difference, and the ultimate reading of phase difference will be one or more times 360° plus the excess number of degrees.

Reverting to Figs. 3 and 2, the normal or center frequency of the carrier wave produced by the carrier oscillator T3 in the transmitter is maintained at substantially completely accurate selected frequency, for example aforesaid 40 kilocycles per second, notwithstanding the tendency of the carrier frequency to drift from the selected frequency. To this end there is procured via conductor 3, Figs. 1, 3 and 4, from the output of discriminator T9, T10, at the receiver, a voltage having modulator frequency and direct current components; that voltage is impressed upon the resistance and capacity filter F2, Fig. 4, whose output is a direct current voltage impressed, via conductor 4, Figs. 1, 2 and 4, upon the suppressor grid of modulator tube T2; that direct current voltage has a magnitude which is a linear function of the deviation of the center frequency of the carrier wave from the normal desired or selected magnitude, with the result the frequency of the carrier current in the transmitting system is, by control originating in the receiver, maintained substantially perfectly the same as that to which the carrier frequency system at that receiver is attuned; if for any cause the tuning of the carrier receiver changes, the center frequency of the carrier at the transmitter is, by and in accordance with such change in tuning, correspondingly changed.

Inasmuch as there may be caused in the transmitting and/or receiving systems a local phase difference, independent of and not representative of the unknown distance or any part thereof, between the transmitter and receiver currents or voltages of modulating frequency, there preferably is utilized a unit F1, Figs. 2 and 4, such as a capacitive-resistive network, which varies or is variable in sense and to extent to shift the phase of the alternating voltage of modulating frequency in the output of the oscillator T1 as impressed upon the grid of amplifier T14, thereby eliminating any such spurious phase difference between the alternating voltages in the output circuits of transmitter and receiver amplifiers T14 and T11, or between the voltages or currents in the output circuits of tubes T15, T16 and T12, T13, or, ultimately, between the uni-directional voltages impressed respectively upon the grids of tube T17. As a result of this phase adjustment, the readings of the phase meter will be related solely to the distance of propagation of the carrier waves in the medium from the transmitting transducer 1 to receiver transducer 2.

What I claim is:

A system for measuring the distance to a reflecting surface comprising means for receiving signal energy reflected from the surface, means including a sharply tuned filter for providing a train of impulses from the received energy and for temporarily continuing to provide such impulses upon disappearance of received signal energy, and means utilizing said impulses to indicate the distance to said reflecting surface and upon disappearance of received signal energy temporarily to continue the preceding indication of distance.

EDWARD W. YETTER.

REFERENCES CITED

The following references are of record in the file of this patent:

UNITED STATES PATENTS

| Number | Name | Date |
|---|---|---|
| 2,268,643 | Crosby | Jan. 6, 1942 |
| 2,050,418 | Boerner | Aug. 11, 1936 |
| 2,147,810 | Alford | Feb. 21, 1939 |
| 2,183,399 | Heising | Dec. 12, 1939 |
| 2,349,261 | Ginzton | May 23, 1944 |
| 2,236,893 | Chaffee | Apr. 1, 1941 |
| 2,054,676 | La Pierre | Sept. 15, 1936 |

FOREIGN PATENTS

| Number | Country | Date |
|---|---|---|
| 472,891 | British | Sept. 29, 1937 |
| 546,202 | British | July 2, 1942 |